(12) United States Patent
Urbanek

(10) Patent No.: US 7,160,844 B2
(45) Date of Patent: *Jan. 9, 2007

(54) PROPPANTS AND THEIR MANUFACTURE

(75) Inventor: Thomas W. Urbanek, Calgary (CA)

(73) Assignee: Global Synfrac Inc., Calgary (CA)

( * ) Notice: Subject to any disclaimer, the term of this patent is extended or adjusted under 35 U.S.C. 154(b) by 130 days.

This patent is subject to a terminal disclaimer.

(21) Appl. No.: 10/804,868

(22) Filed: Mar. 19, 2004

(65) Prior Publication Data

US 2005/0096207 A1    May 5, 2005

(51) Int. Cl.
*C09K 8/80* (2006.01)

(52) U.S. Cl. .................... 507/269; 507/906; 507/924; 166/280.1; 166/280.2

(58) Field of Classification Search ............ 166/280.1, 166/280.2; 507/269, 906, 924
See application file for complete search history.

(56) References Cited

U.S. PATENT DOCUMENTS

| | | | |
|---|---|---|---|
| 3,976,138 A | | 8/1976 | Colpoys, Jr. et al. |
| 4,522,731 A | | 6/1985 | Lunghofer |
| 4,713,203 A | | 12/1987 | Andrews |
| H626 H | * | 4/1989 | Covino .................. 501/12 |
| 4,957,886 A | * | 9/1990 | Mathers et al. ......... 501/96.1 |
| 5,030,603 A | | 7/1991 | Rumpf et al. |
| 5,964,291 A | * | 10/1999 | Bourne et al. ............ 166/279 |
| 6,197,073 B1 | * | 3/2001 | Kadner et al. ........... 23/305 A |
| 6,372,678 B1 | * | 4/2002 | Youngman et al. ....... 501/128 |
| 6,599,493 B1 | * | 7/2003 | Collins et al. ............ 423/632 |
| 6,602,919 B1 | * | 8/2003 | Collins ................. 516/98 |
| 2002/0004547 A1 | * | 1/2002 | Kaltenborn et al. ...... 524/442 |
| 2002/0068775 A1 | * | 6/2002 | Munzenberger .......... 524/2 |
| 2004/0255823 A1 | * | 12/2004 | Comrie ................. 106/789 |

FOREIGN PATENT DOCUMENTS

FR    2669918 A1 *  6/1992

OTHER PUBLICATIONS

Barsoum, M.W., *Fundamentals of Ceramics,* IOP Publishing Ltd, Bristol, 2003, Table of Contents and pp. 1-3.
"Ceramic," *Merriam-Webster Online Dictionary,* <http://www.m-w.com/dictionary/ceramic> [retrieved Dec. 19, 2005].
"Ceramics," *Encyclopedia Britannica Online,* <http://www.britannica.com/ebc/article-9360184?query=ceramic&ct=... > [retrieved Dec. 19, 2005].
Cotton, F.A., et al., *Basic Organic Chemistry,* 3d ed., John Wiley & Sons, Inc., New York, 1976, p. 774.
Davidovits, J., *Geopolymers: Inorganic Polymeric New Materials,* Geopolymer Institute, Saint-Quentin, France, 1997, pp. 1-14, reprint of a paper published in *J. Thermal Anal.* 37:1633-1656, 1991.
Kaps, Ch., and A. Buchwald, *Property Controlling Influences on the Generation of Geopolymeric Binders Based on Clay,* Geopolymer, Melbourne, Australia, 2002, pp. 1-12.
"Science: About Geopolymers" n.d., <http://www.geopolymer.org> [retrieved Dec. 14, 2005], 8 pages.

* cited by examiner

*Primary Examiner*—Philip C. Tucker
(74) *Attorney, Agent, or Firm*—Christensen O'Connor Johnson Kindness PLLC

(57) ABSTRACT

Small spheres, commonly referred to as proppants, are manufactured from sol-gel ceramics, preferably aluminosilicates or phosphates, and include chemical composites termed geopolymers. In the preferred manufacturing process, the required chemical components are blended, and the proppant particles are shaped and cured at low temperatures. The proppant particles have high compressive strength, are chemically inert, and a low specific gravity, making them particularly suited for hydraulic fracturing.

14 Claims, No Drawings

PROPPANTS AND THEIR MANUFACTURE

BACKGROUND OF THE INVENTION

Hydraulic fracturing is a process of injecting fluids into an oil or gas bearing formation at sufficiently high rates and pressures such that the formation fails in tension and fractures to accept the fluid. In order to hold the fracture open once the fracturing pressure is released, a propping agent (proppant) is mixed with the fluid and injected into the formation. Hydraulic fracturing increases the flow of oil or gas from a reservoir to the well bore in at least three ways: (1) the overall reservoir area connected to the well bore is increased, (2) the proppant in the fracture has significantly higher permeability than the formation itself, and (3) the highly conductive (propped) channels create a large pressure gradient in the reservoir past the tip of the fracture.

Proppants are preferably spherical particulates that have to withstand high temperatures, pressures, and the corrosive environment present in the formation. If the proppant fails to withstand the closure stresses of the formation, it disintegrates, producing fines or fragments which reduce the permeability of the propped fracture. Early proppants were based on silica sand, glass beads, sand, walnut shells, or aluminum pellets. Silica sand (frac-sand) is still the most prevalent proppant. The use of frac-sand is, however, limited to depths of approximately 1,800 m.

U.S. Pat. No. 4,068,718 relates to a synthetic proppant formed of 'sintered bauxite' with an apparent specific gravity greater than 3.4 g/cm$^3$. While the proppant had sufficient compressive strength, the high specific gravity prevented it from being carried far into the fractures. U.S. Pat. No. 4,427,068 describes intermediate strength composite proppants made by mixing calcined diaspore clay, burley clay or flint clay with alumina, 'bauxite' or mixtures thereof. The sintered pellets had a specific gravity between 2.7 and 3.4 g/cm$^3$. U.S. Pat. No. 4,522,731 relates to an intermediate strength proppant which is produced by spray agglomeration, featuring a density of less than 3.0 g/cm$^3$. U.S. Pat. No. 4,668,645 to Khaund relates to an intermediate strength proppant made from 'bauxitic clay'. The proppants described in the Fitzgibbons, Lunghofer and Khaund patents have specific gravities lower than that of the earlier Cooke proppant, and proppants having such lower specific gravities have been used with some success in intermediate depth wells where the stress on the proppant is 5,000 to 10,000 psi.

It is desirable to have still lighter weight proppants which are easier to transport in the fracturing fluid and are therefore carried farther into the fracture before settling out.

SUMMARY OF THE INVENTION

There is therefore provided a proppant made from a particulate sol-gel ceramic, such as sol-gel ceramics made from aluminosilicate and phosphate precursors. In a method of manufacturing a proppant, there are provided the steps of forming a sol-gel composition, for example from aluminosilicates, such as geopolymers, or from phosphates, or other suitable sol-gel ceramic forming material, and shaping and curing the blend of sol-gel ceramic forming material to form particulate sol-gel ceramic having a roundness and compressive strength suitable for use as a proppant. The process is preferably carried out at temperatures below 200° C., more preferably below 80° C. and above 30° C. In a preferred embodiment, the resulting particulate sol-gel ceramic has an apparent specific gravity of 1.4 to 1.9 g/cm$^3$.

These and other features of the invention are described in the detailed description and claimed in the claims that follow.

DETAILED DESCRIPTION OF PREFERRED EMBODIMENTS

In this patent document, the word comprising is used in its inclusive sense and does not exclude other elements being present. The indefinite article "a" before an element of a claim does not preclude others instances of the element being present.

This invention describes the use of sol-gel ceramic to make proppants. A sol is a suspended dispersion of a solid in a liquid. Aqueous sols typically have a particle size less than approximately 0.1–1 µm. A gel is a mixture of a solid and liquid with an internal network structure so that both the liquid and solid are in highly dispersed state. The liquid and solid components used to make the gel are known as sol-gel precursors. Gels have a viscosity that allows them to be shaped, for example by rotation in a drum, into particulates. The sol is preferably made from ceramic oxides mixed and dissolved in a suitable solvent, such as water. Polymerization of the blended sol results in a gel being formed, which may then be processed by shaping and curing to form appropriately shaped proppant particles.

In particular, this patent document describes the use of sol-gel ceramics formed from suitable inorganic ceramic forming pre-cursors such as aluminosilicates, and more particularly the class of aluminosilicates known as geopolymers, and phosphates, in the manufacture of proppants. Aluminosilicates as used in this patent document are defined as minerals of the general formula $Al_2SiO_5$. Examples of aluminosilicates that may be used for the formation of proppants are fly ash, fly ash C, silica and aluminum oxide, pozzolan, ground slag, nepheline syenite, hydrous and anhydrous aluminum silicate, calcined kaolin, kaolinite, and mixtures of these minerals. Commercial sources of preferred aluminosilicates include Snowtex 45 from US Silica Company or Huber 2000C from J.M. Huber Corporation. A geopolymer as used in this patent document is defined as a material, chemically similar to zeolites, but with an amorphous or semi-crystalline microstructure. Geopolymers form by polycondensation reaction ('geopolymerization') of alumino and silicate species, which originate from the dissolution of silicon and aluminum containing source materials at a high pH in the presence of soluble alkali metal silicates. It has been shown before that geopolymerization can transform a wide range of waste alumino-silicate materials into building and mining materials with excellent chemical and physical properties, such as fire and acid resistance. Examples of geopolymers that may be used for the formation of proppants are 'DAVYA 30', 'DAVYA 60', DAVYA 20XT, or Geopolymite, which may be commercially obtained for example from the Geopolymer Institute, Saint-Quentin, France.

The use of sol-gel ceramics for making proppants allows the manufacture of synthetic proppants at temperatures below 200° C. utilizing conventional pelletizing equipment. When aluminosilicates are used as the sol-gel ceramic precursors, the resulting proppants have an apparent specific gravity of 1.4–1.9 g/cm$^3$, which is believed to be lower than any previously manufactured proppants. Compressive strengths range from 6,000 to 15,000 psi (41 to 103.5 MPa), which is a range of strength suitable for use as a proppant. Apparent specific gravity is determined according to ASTM Standard D-2840-69.

Inorganic binders are characterized by several distinct properties, including thermal stability, high surface smoothness, and hard surfaces. As a result, inorganic binders are particularly useful in specialty applications, such as saline or aqueous environments.

Synthesis of geopolymers was previously described in various U.S. Pat. Nos. namely 3,950,470, 4,028,454, 4,349,386, 4,472,199, 4,509,985, 4,859,367, 4,888,311, 5,244,726, 5,288,321, 5,342,595, 5,349,118, 5,352,427, 5,539,140, 5,798,307, 5,820,668, and 5,851,677, although caution should be used in reading these patents since some contain technical errors. Geopolymers are made in accordance with the processes described in U.S. Pat. Nos. 5,342,595, 5,349,118, 5,352,427, 5,539,140, 5,798,307, 5,820,668, and 5,851,677 may be used in the processes described here to make a particulate sol-gel ceramic, with the additional step of forming the resulting particulate sol-gel ceramic into particles having a roundness suitable for used as a proppant. These geopolymers are found in a wide range of applications, such as masonry tiles, heat-resistant components, filters, and the encapsulation of hazardous wastes for long term disposal.

Geopolymers are generally synthesized from sodium or potassium salts of polysilisic acid and naturally occurring aluninosilicates, such as kaolinite clay. The formation of geopolymers is similar to polycondensation reactions of organic polymers and proceeds rapidly at temperatures below 80° C.

Additives, such as fillers, plasticizers, cure accelerators and retarders, and rheology modifiers may be used in this composition in order to achieve desired economical, physical, and chemical properties of the proppant during the mixing of the chemical components, forming and cure of the particles, and the field performance of the geopolymer-based proppants.

Compatible fillers include waste materials such as fly ash, sludges, slags, waste paper, rice husks, saw dust, etc., volcanic aggregates, such as expanded perlite, pumice, scoria, obsidian, etc., minerals, such as diatomaceous earth mica, borosilicates, clays, metal oxides, metal fluorides, etc., plant and animal remains, such as sea shells, coral, hemp fibers, etc., manufactured fillers, such as silica, mineral fibers and mats, chopped or woven fiberglass, metal wools, turnings, or shavings.

By using geopolymers or other sol-gel ceramics in the production of proppants, the described invention overcomes four problems associated with current synthetic proppant technologies: (1) the proppants can be manufactured at low temperatures, which offers significant energy and capital cost savings, (2) the low specific gravity reduces the chances for the proppant to settle out of the fracturing fluid, (3) less complex and lower cost fracturing fluids can be used, and (4) larger than conventional proppant particles can be used in order to increase the permeability of the fracture.

The proppants formed according to the disclosed information may also be coated with a layer of epoxy, furan, phenolic resins, and combinations of these resins, to improve their performance characteristics and utility. The coating may be carried out in accordance with known ways of coating proppants.

The particulate sol-gel ceramics may be made from geopolymers by a process comprising several steps. In the first step, the liquid and solid components of the geopolymer are prepared. The two components are then homogeneously blended and pelletized in order to form spheroid particles. The sol or liquid components typically comprise of highly alkaline alkali metal silicates and the solid components typically comprise of powdered alumino-silicates. Homogenous blending to form a gel is carried out for example by Littleford mixer or Eirich machines.

The type of mixer used in the process of forming spheroid particles is important since it has several important functions. It must process the geopolymer into spheroids having a high Krumbein roundness, and it should do this at a relatively high yield of particles in the range of 1.35 to 0.17 millimeters (12 to 70 mesh). The minimum average Krumbein roundness and sphericity for proppant use is 0.7 according to the API standard referred to in paragraph 24. Several types of mixing apparatus may be applied. Balling pans or disk agglomerators, found in the mining industry, may be used.

Machines known as high energy mix pelletizers are best suited to this application. Two examples of such machines are the Littleford mixer and the machine known as the Eirich machine. The Eirich machine is described in U.S. Pat. No. 3,690,622. This machine comprises basically a rotating cylindrical container, the central axis of which is at an angle to the horizontal, one or more deflector plates, and at least one rotating impacting impeller usually located below the apex of the path of rotation of the cylindrical container. The rotating impacting impeller engages the material being mixed and may rotate at a higher angular velocity than the rotating cylindrical container itself.

There are two basic steps in making the spheroids in high energy mix pelletizer: (1) the forming of pellets at high speed mixing, and (2) the polishing or smoothing the surfaces of the spheroids by turning off the impacting impeller and allowing the cylindrical container to rotate. This last operation is similar to a balling pan.

The wet spheroids are discharged from the mix pelletizer and cured at temperatures of 30 to 200° C. The curing step may be done statically, but a rotary kiln is the preferred apparatus for this step. The residence time of the spheroids in the kiln is dependent upon several parameters: kiln length, diameter, rotational speed, feed rate to the kiln, temperature within the kiln, and the particle size of the spheroids. Residence time is adjusted to achieve sufficient strength to provide storage stability, but may also further the process of reaching ultimate particle strength. Typical residence times in the kiln correspond to 20 minutes or more.

As residence time becomes shorter, the process is more difficult to control because some spheroids may not be subjected to the correct thermal history and thus not attain the desired strength. There is no particular advantage to residence times which are longer than the optimum. However, a given particle can be made at lower temperatures if longer residence times are used.

The product from the kiln is screened to obtain the desired particle size fraction, usually about 20/40 mesh (0.69 to 0.36 mm). Either before, during or after this screening step, the spheroids may be subject to vigorous agitation by air or some other agitation means in order to remove dust from their surfaces.

Means for evaluating the properties of proppants are found in American Petroleum Institute Publications such as: API Recommended Practice 60, Second Edition, December 1995, Recommended Practices for Testing High-Strength Proppants Used in Hydraulic Fracturing Operations. For example, when tested under the API procedures, the recommended fines limit in weight % is 25% for proppant size 12/20 and 16/20, 10% for proppant size 20/40 and 8% for proppant size 40/70.

Other sol-gel ceramic materials suited for the manufacture of proppants include chemically bonded phosphate cements (CBPCs). CBPCs are formed by acid-base reactions between phosphoric acid or its salts, including sodium, potassium, ammonium, or aluminum phosphates, and a metal oxide, including magnesium, calcium, aluminum, silicon, or iron oxides, or mixtures thereof. A typical reaction can be written as follows:

$$MgO+KH_2PO_4+5H_2O \rightarrow KMgPO_4 \cdot 6H_2O$$

When a metal oxide is stirred in a phosphoric acid or phosphate solution, it dissolves and forms cations that react with the phosphate anions to form a phosphate gel. The gel subsequently crystallizes and consolidates to form the phosphate cement. CBPCs are produced by controlling the solubility of the oxide in the phosphoric acid or phosphate solution. Oxides or mixtures of oxides of low solubility are preferred in the manufacture of CBPCs since their solubility can be controlled easily, for example oxides of divalent and trivalent metals, including magnesium, calcium, and zinc oxides. Even more preferred are trivalent metal oxides as they are less soluble, including aluminum and iron oxides. Phosphate cements have been used as dental cements, and in the encapsulation of hazardous waste. CBPCs possess high compressive strength, high abrasion and chemical resistance, and low porosity and specific gravities, all properties desirable in the manufacture of proppants. Proppants made using CBPCs may be prepared in like manner to the proppants made using aluminosilicates.

The invention will be further clarified by a consideration of the following examples, which are intended to be purely exemplary.

EXAMPLE 1

A mixture is prepared with the following mix ratios by weight:

$$SiO_2/K_2O=7.43, SiO_2/Al_2O_3=1.56, SiO_2/H_2O=1.06$$

The source of aluminum oxide is an alumino-silicate $(Si_2O_5, Al_2O_2)_n$, prepared by dehydroxylating a natural polyhydroxy-alumino-silicate $(Si_2O_5, Al_2(OH)_4)_n$. The sources of silicon dioxide are this alumino-silicate and potassium silicate. The sources of potassium oxide are potassium silicate and potassium hydroxide. The mole ratios in the reactant mixture are shown above. The reactants are thoroughly blended and shaped using an Eirich machine, and cured to form pellets of 0.69 to 0.36 millimeter diameter. In one example, curing was carried out using a residence time of the spheroids in the kiln of 60 minutes, with kiln length of 20 meter, a diameter of 2 meter and a temperature within the kiln of 75° C. The pellets show an apparent density of approximately 1.7 g/cm³ and 2.1% formation of dust at 7,500 psi, and have a Krumbein roundness above 0.7 and compressive strength suitable for use as a proppant.

EXAMPLE 2

A reaction mixture is prepared with the following mix ratios by weight:

$$SiO_2/K_2O=7.8, SiO_2/Al_2O_3=1.53, SiO_2/H_2O=1.1, SiO_2/F=5.37$$

The source of aluminum oxide is an alumino-silicate $(Si_2O_5, Al_2O_2)_n$, prepared by dehydroxylating a natural polyhydroxy-alumino-silicate $(Si_2O_5, Al_2(OH)_4)_n$. The sources of silicon dioxide are this alumino-silicate and potassium silicate. The sources of potassium oxide are potassium silicate and potassium hydroxide. The source of fluoride is sodium fluosilicate. The mole ratios in the reactant mixture are shown above. The reactants are thoroughly blended and shaped using an Eirich machine, and cured to form pellets of 0.69 to 0.36 millimeter diameter. In one example, curing was carried out using a residence time of the spheroids in the kiln of 60 minutes, with kiln length of 20 meter, a diameter of 2 meter and a temperature within the kiln of 75° C. The pellets show an apparent density of approximately 1.75 g/cm³ and 1.9% formation of dust at 7,500 psi, and have a Krumbein roundness above 0.7 and compressive strength suitable for use as a proppant.

EXAMPLE 3

A reaction mixture is prepared with the following mix ratios by weight:

| | | |
|---|---|---|
| MgO | 40.3 g | 7.6% |
| $KH_2PO_4$ | 136.1 g | 25.6% |
| $5H_2O$ | 90.1 g | 17.0% |
| Fly ash (Class C) | 264.6 g | 49.8% |

The reactants are thoroughly blended and shaped using an Eirich machine, and cured to form pellets of 0.69 to 0.36 millimeter diameter. In one example, curing was carried out using a residence time of the spheroids in the kiln of 60 minutes, with kiln length of 20 meter, a diameter of 2 meter and a temperature within the kiln of 50° C. The pellets show an apparent density of approximately 1.7 g/cm³ and 1.5% formation of dust at 5,000 psi, and have a Krumbein roundness above 0.7 and compressive strength suitable for use as a proppant.

Immaterial modifications may be made to the method and product described here without departing from the invention.

What is claimed is:

1. A method of manufacturing a proppant, the method comprising the steps of: forming a sol-gel composition from ceramic precursors; and shaping and curing the sol-gel composition to form particulate sol-gel ceramic having a roundness and compressive strength suitable for use as a proppant; in which the sol-gel composition is a blend of aluminosilicates and aqueous solutions of alkali metal silicates, and wherein the forming, shaping and curing comprises: forming spheroidal pellets: smoothing the spheroidal pellets; and curing the spheroidal pellets.

2. The method of claim 1, wherein the aluminosilicates comprise geopolymers.

3. A proppant comprising a particulate composition which is a blend of aluminosilicates and aqueous solutions of alkali metal silicates, and further comprising a coating selected from the group consisting of an epoxy resin, a furan resin, a phenolic resin and a combination of resins.

4. The proppant of claim 3, wherein the particulate composition is a particulate sol-gel composition.

5. A proppant comprising a particulate composition, wherein the particulate composition comprises a geopolymer, and further comprising a coating selected from the group consisting of an epoxy resin, a furan resin, a phenolic resin and a combination of resins.

6. The proppant of claim 5, wherein the particulate composition is a particulate sol-gel composition.

7. A proppant comprising a sol-gel ceramic, wherein the sol-gel ceramic is unsintered and made by blending, forming, and curing at temperatures below 200° C., and further comprising a coating selected from the group consisting of an epoxy resin, a furan resin, a phenolic resin and a combination of resins.

8. The proppant of claim 7, wherein the sol-gel ceramic is unsintered and made by blending, forming, and curing at temperatures below 80° C.

9. A method of manufacturing a proppant, the method comprising the steps of: forming a composition from a geopolymer; and shaping and curing the composition to form a pellet; wherein the pellet has a roundness and compressive strength suitable for use as a proppant, and wherein the forming, shaping and curing comprises: forming spheroidal pellets; smoothing the spheroidal pellets; and curing the spheroidal pellets.

10. The method of claim 9, wherein the composition is a sol-gel composition.

11. A method of manufacturing a proppant, the method comprising the steps of: forming a sol-gel composition from ceramic precursors; and shaping and curing the sol-gel composition to form particulate sol-gel ceramic having a roundness and compressive strength suitable for use as a proppant; in which the sol-gel composition is a blend of aluminosilicates and aqueous solutions of alkali metal silicate, and comprising the further step of coating the proppant with a coating selected from the group consisting of an epoxy resin, a furan resin, a phenolic resin and a combination of resins.

12. The method of claim 11, wherein the aluminosilicates comprise geopolymers.

13. A method of manufacturing a proppant, the method comprising the steps of: forming a composition from a geopolymer; and shaping and curing the composition to form a pellet; wherein the pellet has a roundness and compressive strength suitable for use as a proppant; comprising the further step of coating the proppant with a coating selected from the group consisting of an epoxy resin, a furan resin, a phenolic resin and a combination of resins.

14. The method of claim 13, wherein the composition is a sol-gel composition.

* * * * *

UNITED STATES PATENT AND TRADEMARK OFFICE
CERTIFICATE OF CORRECTION

PATENT NO. : 7,160,844 B2  Page 1 of 1
APPLICATION NO. : 10,804868
DATED : January 9, 2007
INVENTOR(S) : T.W. Urbanek It is certified that error appears in the above-identified patent and that said Letters Patent is hereby corrected as shown below:

| COLUMN | LINE | ERROR |
|---|---|---|
| 6 (Claim 1, | 47 line 9) | "pellets:" should read --pellets;-- |

Signed and Sealed this

Third Day of April, 2007

JON W. DUDAS
*Director of the United States Patent and Trademark Office*

UNITED STATES PATENT AND TRADEMARK OFFICE
CERTIFICATE OF CORRECTION

PATENT NO. : 7,160,844 B2  
APPLICATION NO. : 10/804868  
DATED : January 9, 2007  
INVENTOR(S) : T.W. Urbanek Page 1 of 1

It is certified that error appears in the above-identified patent and that said Letters Patent is hereby corrected as shown below:

| COLUMN | LINE | ERROR |
|---|---|---|
| (30) Pg. 1, col. 1 | Foreign Appln. Priority Data | insert in appropriate order --(30) Foreign Application Priority Data Nov. 4, 2003 (CA) 2447928-- |

Signed and Sealed this

Second Day of October, 2007

JON W. DUDAS  
*Director of the United States Patent and Trademark Office*